United States Patent
Kenue

[11] Patent Number: 6,150,932
[45] Date of Patent: Nov. 21, 2000

[54] VEHICLE OPERATOR ALERT PROCESS

[75] Inventor: Surender Kumar Kenue, Southfield, Mich.

[73] Assignees: General Motors Corporation, Detroit; Delphi Technologies, Inc., Troy, both of Mich.

[21] Appl. No.: 09/411,220

[22] Filed: Oct. 4, 1999

[51] Int. Cl.[7] .................................................. B60Q 1/00

[52] U.S. Cl. ........................ 340/435; 340/436; 340/903; 340/904; 701/300

[58] Field of Search .................................. 340/901, 903, 340/904, 435, 436; 701/300

[56] References Cited

U.S. PATENT DOCUMENTS

| | | | |
|---|---|---|---|
| 4,970,653 | 11/1993 | Kenue | 364/461 |
| 5,014,200 | 5/1991 | Chundrlik et al. | 364/426.04 |
| 5,173,859 | 12/1992 | Deering | 364/426.01 |
| 5,530,651 | 6/1996 | Uemura et al. | 340/435 X |

*Primary Examiner*—Daryl Pope
*Attorney, Agent, or Firm*—George A. Grove

[57] ABSTRACT

A method is disclosed for analyzing range and range rate data obtained by a vehicle obstacle detection system to determine whether the dynamic situation justifies alerting the vehicle operator of reducing the speed of the vehicle. Assumed values of vehicle and obstacle deceleration are used with known and assumed values of their velocities to calculate limiting warning distances that in turn are used to calculate an estimated warning distance. The estimated distance is compared with the range value as a basis of determining whether an alert is made.

8 Claims, 2 Drawing Sheets

VEHICLE OPERATOR ALERT PROCESS

TECHNICAL FIELD

This invention relates to the use of electronic devices and computer-executed processes in assisting automotive vehicle control. More specifically, this invention relates to processes for timely indication of a vehicle obstacle alert condition.

BACKGROUND OF THE INVENTION

Electronic detection devices and computer managed control processes have been proposed for varying the speed of an automotive vehicle in response to sensed obstacles in or near the path of the vehicle. Proposed control systems have included an obstacle detection system with a transmitter to propagate a signal along the path of the vehicle and a receiver to collect reflections of the signal from an obstacle in or near the path. In addition, proposed systems included means to amplify and communicate such reflections to a microprocessor for resolving such information as the range between the vehicle and the obstacle and the time rate at which the range was changing (referred to as range rate). The range and range rate information is then applied in a defensive manner. The operator of the vehicle would be alerted of the potential hazard or a change would be effected in the operation of the vehicle independent of the operator.

The action required under such proposed procedures, whether to notify the operator or to change vehicle operation, is intrusive. False alarms, such as inaccurate indications that action is required to avoid an obstacle, can reduce vehicle operator satisfaction and can reduce confidence in the control system. Such false alarm conditions should therefore be minimized.

Many automatic vehicle control approaches are subject to frequent false alarm conditions. Such false alarm conditions may result from modeling error. For example, mathematical models determining conditions under which alarm conditions are activated may be oversimplified, relying on broad assumptions about vehicle behavior and operator requirements. Use of such proposed models has resulted in limited commercial acceptance of automatic vehicle controls.

It would, therefore, be desirable to provide an improved process for using range and range rate data from an obstacle detector to determine alarm conditions that are more compatible with the actual reaction of the operator and, therefore, more useful in increasing safe operating conditions.

SUMMARY OF THE INVENTION

This invention provides a method of using range and range rate data from an obstacle detection system to assist in avoiding contact with the obstacle. The method uses known physical principles relating the stopping distances of moving objects in combination with certain modifying parameters to better avoid the provision of alarm signals or modification of vehicle speed in situations where such action would be perceived as clearly unnecessary by the operator. In other words, an object of this invention is to manage and process obstacle range and range rate information in a manner that contributes to safe operation of the vehicle while promoting operator acceptance of the system.

Equations are known for determining the stopping distance of an object at a known initial velocity when the object undergoes uniform deceleration. However, such equations require that the deceleration (or negative acceleration) be constant and they require knowledge of the value of that constant.

In the case of many modern automotive vehicles with brake or traction controls, velocity sensors are used at each wheel. Thus, the velocity of the vehicle is, or can be, determined at each processing cycle (often each 100 milliseconds) of the microprocessor employed to control the brake system. When the vehicle is equipped with a suitable obstacle detection system, such as a radar system, the distance between the operated vehicle and the obstacle, i.e., the range, can be determined with precision. The same system can also be used to determine the time rate of change of the range, sometimes called the range rate. Given knowledge of the velocity of the vehicle, a velocity of the obstacle (if it is moving) can be determined. However, existing automobile obstacle detection systems do not detect the acceleration of a moving obstacle. Moreover, most current vehicles are not provided with accelerometers and deceleration of the vehicle cannot be measured.

In accordance with this invention, constant deceleration rates are assumed for both the operated vehicle (often referred to herein as the host vehicle) and the obstacle, unless the obstacle is determined to be stationary, to enable the use of simple dynamics equations for determining useful stopping distances and times. Actual and assumed vehicle and obstacle velocities are also used in the equations to acquire useful predictive data for assessing a potential alarm situation. These calculated values of stopping distance are in certain instances modified by arbitrary parameters, termed herein p and q, to further modify the calculated stopping distance to reach values determined to be useful in better assessing acquired range and range rate data for such alarm situations.

The use of assumed acceleration rates for moving host vehicle and obstacle results from and is supported by computer simulations of lead vehicle/following vehicle situations. Several millions of driving scenarios with varying obstacle and host vehicle velocities, decelerations and ranges were generated. For each scenario, it was determined by basic dynamics whether a crash resulted. A Monte Carlo simulation of driver response time to the obstacle (based on log normal distribution), driver delay time to warning signal and brake application (based on normal distributions) was done for generating values for driver delay times. Using these delay values and driving scenarios data, statistics were generated for minimizing the number of false alarms while assuring safe warning results. The optimization procedure led to a selection of a preferred value of 3 m/s$^2$ for obstacle deceleration and a preferred value of 6 m/s$^2$ for host vehicle deceleration in calculating certain boundary condition stopping distances in accordance with a preferred embodiment of the invention.

Examples of the use of such assumed values of host and obstacle vehicle decelerations and assumed and actual values of their velocities in evaluating possible lead vehicle and following vehicle crash situations are illustrated in this specification. In a preferred embodiment, two limiting warning distances between vehicle and obstacle are calculated. One limiting distance is based on the assumption that the obstacle is stationary and the second limiting distance is calculated assuming that the vehicle and obstacle velocities are the same. These limiting distances are used in the calculation of a warning distance for comparison with the range value to assess whether an alert should be effected.

In a preferred embodiment, the illustrated calculations are repeatedly made with each processing cycle of the computer. However, it is to be recognized that a schedule of warning distance data, correlated with vehicle velocity, range and range rate, can be pre-calculated and stored in the detection system processor in the form of a look-up table. Although such a schedule requires suitable computer memory, it shortens data processing time. Vehicle velocity, range and range rate data once determined can be used for entry to the look-up table in providing a vehicle alert.

Other practices, objects and advantages of the invention will become more apparent from a description of a preferred embodiment.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
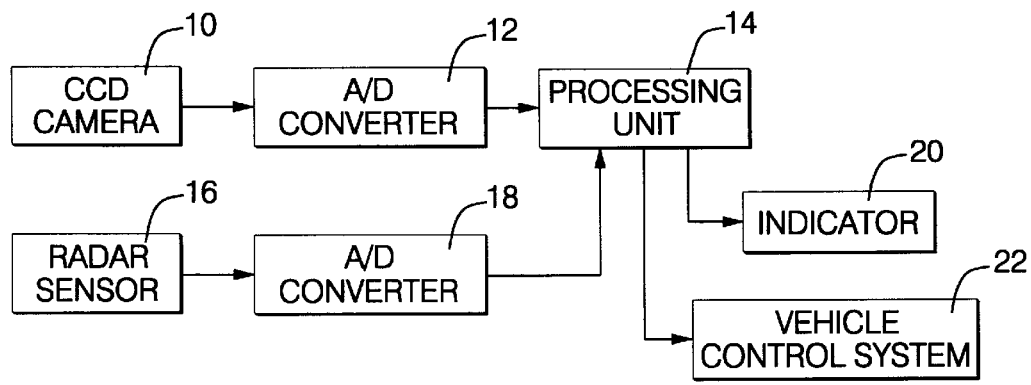
FIG. 1 is a block diagram of the detection system for carrying out the preferred embodiment of this invention.

Referring to FIG. 1, an example of detection hardware used to implement the method of this invention is illustrated in block form. Such hardware comprises a black and white charge coupled device (CCD) video camera 10 mounted in a host (or controlled) vehicle (not shown). Camera 10 is preferably mounted at the upper center of the front windshield (not shown) and coupled to the forward portion of a "rear-view" mirror to capture the host vehicle operator's view of the driving surface ahead. The detection hardware further comprises an analog-to-digital converter 12 of any suitable conventional type for converting the CCD video camera 10 output signal to a digital form for processing in a conventional single chip micro controller data processing unit 14.

The detection hardware further comprises a radar sensor 16 in the form of a conventional MMW (millimeter wave) radar or a laser radar sensor mounted in a forward/rear section of the host vehicle. For example, radar unit 16 is mounted in front/rear of a vehicle grille/bumper (not shown) at the front/rear-most section of the host vehicle. MMW radar typically comprises such known elements as an antenna, down converter, video processor, FMCW modulator and associated electronics, as is generally understood in the art to which this invention pertains. The conventional laser radar sensor comprises such known elements as laser diodes, transmission and receiver lenses, infrared filters, and photodiodes, as is generally understood in the art to which this invention pertains.

Radar sensor 16 transmits an analog signal representing information describing obstacles in or near a path of travel of the host vehicle to an analog-to-digital converter 18. Converter 18 is of suitable conventional type for conversion of the radar sensor output signal to a digital form for application to computer unit 14.

The obstacle detection hardware further comprises an indicator 20, in the form of a conventional device which, when energized by the processing unit 14, emits an audible alert, a visual alert, a haptical alert, or a combination thereof.

The detection hardware further comprises at least one microprocessor-based vehicle control system 22, such as a generally known vehicle braking system, an engine intake air control system, an engine fueling system, or an engine ignition timing control system. An adjustment command is, in accord with an embodiment of this invention, issued from processing unit 14 to such control system 22 to provide for vehicle control, such as vehicle deceleration responsive to diagnosis by the processing unit 14 of an alert condition.

A series of operations are stored in the processing unit 14 in the form of sequences of instructions implemented in software for sampling sensor output signal information, processing the information, interpreting the information to diagnose and indicate alert conditions. In this embodiment, the alert conditions include conditions which, if not corrected, may reasonably lead to an impact condition between the host vehicle and an obstacle preceding the host vehicle, such as another vehicle or an object in the path of the host vehicle. Accordingly, alert conditions are determined and acted upon by indicating such conditions through actuation of indicator 20 of FIG. 1, or by automatically adjusting vehicle braking or drive commands by applying a command to the control system 22 of FIG. 1.

Figure 2:
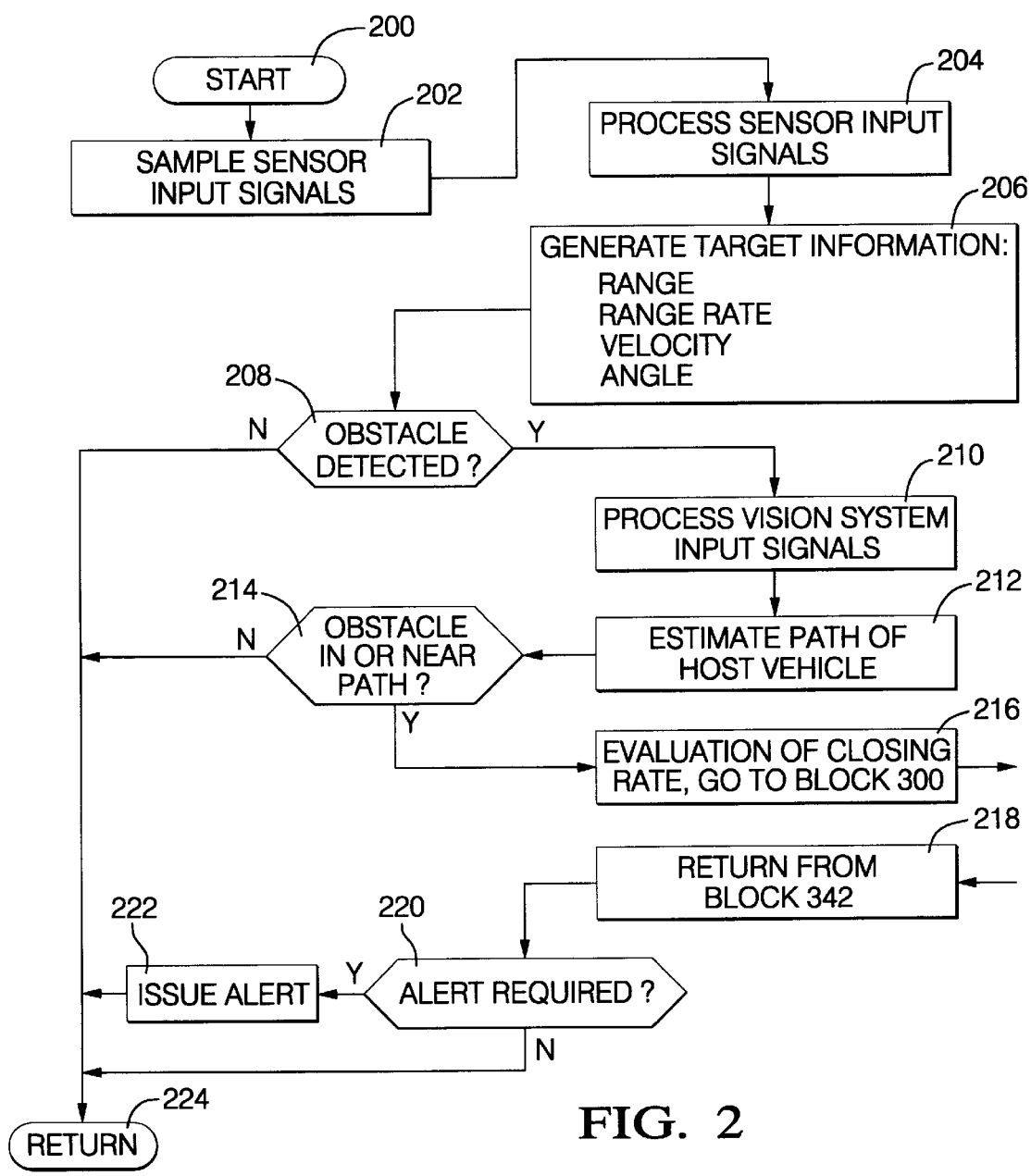
FIGS. 2 and 3 are flow diagrams illustrating a series of operations for carrying out the preferred embodiment of this invention with the detection system of FIG. 1.

More specifically, the process steps of FIG. 2 are periodically executed in processing unit 14 when the ignition is on and electric power is applied to the unit (FIG. 1). For example, the process sequence of FIG. 2 may be carried out every 100 milliseconds in the processing unit 14 as provided through a standard computer timer-based interrupt process.

Each sequential execution of the microprocessor operations of FIG. 2 begins at process block 200 and proceeds to process block 202. In block 202, the processor receives and samples sensor input signals, including output signals from the A/D converters 12 and 18, representing road scene images and preceding obstacle information, respectively. The filtered input signals, originating at sensors 10 and 16 of FIG. 1, are next processed at step 204 through standard filtering processes. The processed signals undergo significant but conventional analysis at process block 206 to generate information characterizing a detected obstacle preceding, or otherwise in front of, the host vehicle.

In process block 206, the sensor data is used to determine the current distance (that is, the range in, for example, meters) between the host vehicle and the obstacle and the time rate of change of the range (range rate) at this cycle of the microprocessor 14. Processor 14 has access to the current velocity of the host vehicle. It stores this information and uses it to determine the speed of the obstacle relative to the vehicle. The angle of the obstacle relative to the axis of the host vehicle is also derived from these signals and host vehicle's dynamics. All such information characterizing the preceding obstacle and its relationship to the host vehicle may be generated at step 206 through application of any suitable conventional approach that is known by those possessing ordinary skill in the art to which this invention pertains.

The process then proceeds to step 208. In block 208, an analysis is made to determine whether an obstacle is in or near the path of the host vehicle. This analysis utilizes the range, range rate and obstacle angle information generated at the step 206. If the query and analysis of block 206 results in a conclusion that there is no obstacle (query answered "no"), the process skips to the return block 224. However, if the analysis of block 208 concludes that there is an obstacle that is a potential problem to the host vehicle, the process advances to process blocks 210–214 where further analysis is commenced.

Process steps 210–214 are carried out to further characterize the relationship between the host vehicle and the obstacle and to provide for an alert condition if necessary. In step 210, vision system input signals from the CCD camera 10 (FIG. 1) are processed to detect lane markers and to determine the relationship of the host vehicle to the lane.

This analysis may involve estimation of lane boundary positions, lateral offsets of the host vehicle and the radius of curvature of the lane in which the host vehicle is traveling. For example, the operations of step 210 may be carried out in the manner disclosed in U.S. Pat. No. 4,970,653, assigned to the assignee of this application and hereby incorporated herein by reference.

The path of the host vehicle is next estimated at step 212. This is accomplished through standard processing of signals output by vehicle dynamics sensors including any lateral or longitudinal acceleration sensors, yaw rate sensors, wheel and vehicle speed sensors, steering angle sensors, etc., as are generally known in the art to which this invention pertains. The path of the host vehicle can be estimated from the yaw rate sensor by dividing the host speed by the yaw rate and applying suitable filtering steps. Moreover, it can also be estimated from other vehicle dynamics sensors and a sensor fusion of using knowledge derived from vehicle dynamics sensors. GPS/map database and vision sensors (lane sensing) can yield a better estimate of host vehicle path.

Once the host vehicle path is estimated, the process reaches another query step at block 214. In step 214, it is determined whether the obstacle is in or near the estimated host vehicle path by using the obstacle's range, range rate and angle data stored in the memory of processor 14. If it is determined that the obstacle is not in the vehicle path (query answered "no"), the process skips to return block 224. However, if the obstacle is determined to be in or near the path of the host vehicle at step 214, then a detailed analysis of the range rate, the closing rate of the vehicle on the obstacle is required. The process advances to process block 216 from which it goes to the subroutine of FIG. 3.

Figure 3:
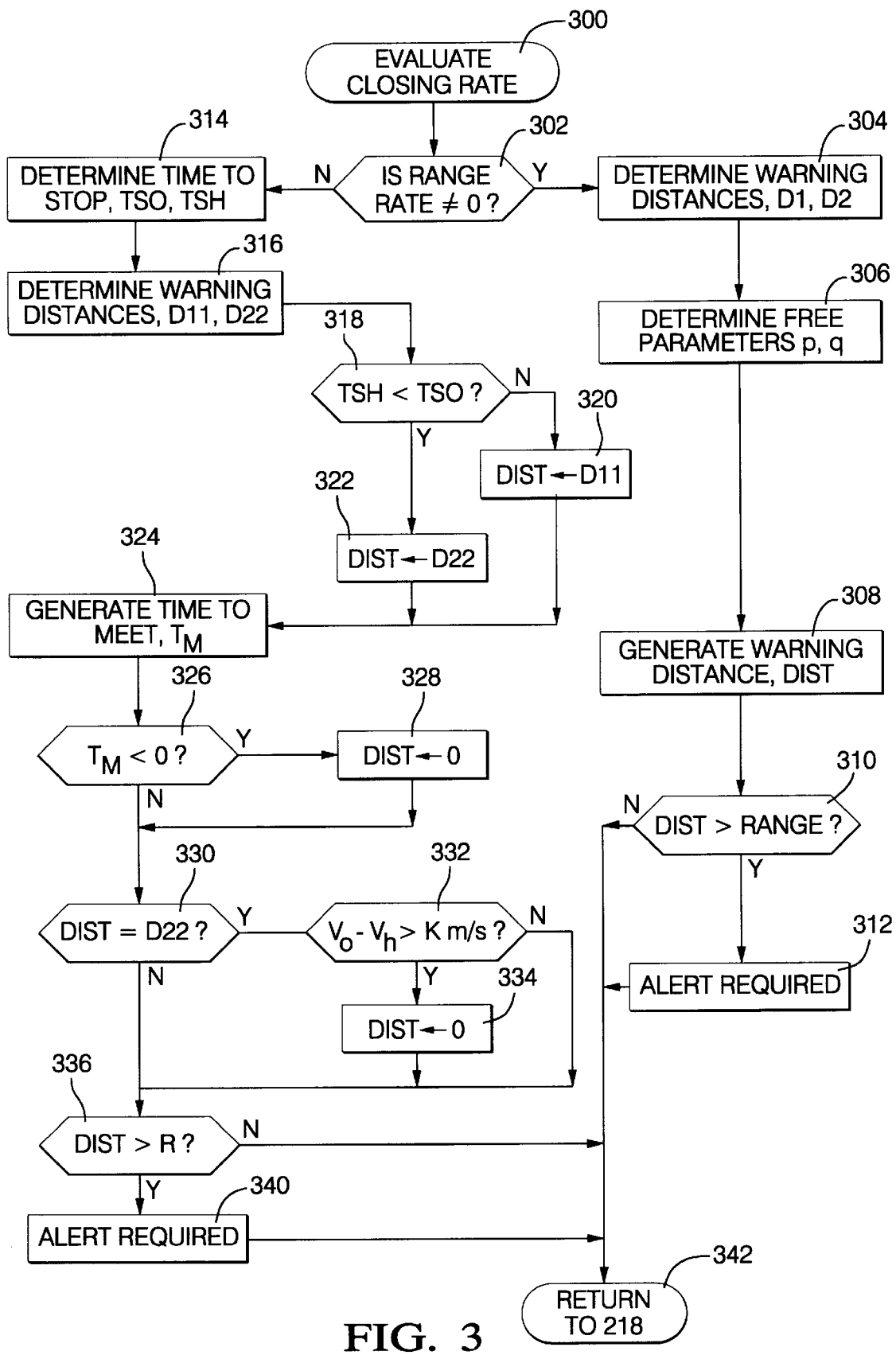

The FIG. 3 subroutine is an important part of this invention. The first block is entitled "Evaluate Closing Rate" and this is the function of this subroutine. During the current processing cycle of processor 14, it has been determined that there is a possible "Alert" situation with the perceived obstacle. It now needs to be determined whether the relative dynamics of the host vehicle and obstacle actually require an alert response from the obstacle detection system.

In the FIG. 3 subroutine, the process proceeds to block 302, a query block, in which it is determined whether the range rate is different than zero. The data required for this query was produced and stored in computer memory during process step 216. If the current range rate is substantially zero (or within a predetermined tolerance), the answer to the specific query is "no" and the process proceeds to block 314. This process path will be described below in this specification. However, if the range rate is not equal zero, the process proceeds to block 304.

Case Where Range Rate Does Not Equal Zero

In block 304, a determination is made of estimated warning distances D1 and D2 based on two limiting, or boundary, relationships between the velocities and the deceleration values of the host vehicle and the obstacle. In many situations the obstacle is another vehicle that is moving slower than the host vehicle or that is stopping.

Before describing a calculation of the boundary condition warning distances, it may be useful to describe the principles of this calculation and like calculations used in this embodiment of the invention.

The process of this invention utilizes as a starting point conventional equations known in the dynamics of moving bodies for determining the stopping time and distance of a body of known velocity under constant negative acceleration, or deceleration. In simplest form, the stopping time, T, and distance, D, of a body of initial velocity, V, and subjected to a negative acceleration of A is $T_{stop}=V/A$ and $D_{stop}=VT/2$ or $D=V^2/2A$ An estimate of a relevant stopping distance of a host vehicle proceeding at a velocity Vh approaching or following an obstacle, or obstacle vehicle, at velocity Vo is more complicated. In addition to the consideration of the relative velocities of the bodies and their unknown decelerations, Ah and Ao, the reaction time, Tr, of the host vehicle operator must be considered. Tr is the total system delay time including estimated or measured operator response time and calibrated system response time, such as may be determined through a conventional calibration procedure or may be measured and stored through a conventional delay time measurement and storage process.

In accordance with this embodiment of the invention, the following equation is used when an assumed stopping time for the obstacle (based on an assumed acceleration of the obstacle) is less than or equal to an assumed stopping time for the host vehicle.

$$D1 = \frac{Vh^2}{2 \cdot Ah} + Vh \cdot Tr - \frac{Vo^2}{2 \cdot Ao}; \text{ when } \frac{Vo}{Ao} \leq \frac{Vh}{Ah} + Tr$$

In the situation when an assumed stopping time for the obstacle greater than the assumed stopping time for the host vehicle, then the following equation is used.

$$D2 = \frac{(Vo - Vh - Tr \cdot Ah)^2}{2 \cdot (Ah - Ao)} - \frac{Ah \cdot Tr^2}{2}; \text{ when } \frac{Vo}{Ao} > \frac{Vh}{Ah} + Tr$$

In process step 304, arbitrary values are calculated for boundary condition warning distance limits where obstacle velocity Vo is assumed to be 0, using equation D1, and where Vo is assumed equal to Vh, using equation D2. In these calculations the actual value for Vo then in processor 14 memory is used. Assumed values of Ah=6 m/s$^2$ and Ao=3 m/s$^2$ are also used.

As explained above, the decelerations Ao and Ah are not usually available and thus estimated values such as Ao=3 m/s$^2$ and Ah=6 m/s$^2$ are used in the equations. The rationale for using these particular values is explained above in the Summary of the Invention section. Obviously, there may be situations when other assumed values for Ah and Ao may be more preferred.

For purposes of illustration of the practice of step 304, consider a scenario with the host velocity Vh of 36 m/s with a system delay time Tr of 2 seconds. For the first case of computing D1 boundary warning limit at Vo=0, the result is 180 meters. For the D2 warning limit (Vo=Vh=36), calculation of D2 yields a distance of 12 meters. As suggested above, these calculations of stopping distances, D1 and D2, are used as arbitrary (because of the assumed values of Vo, Ao and Ah) limits of required stopping distances for the host vehicle under relevant limiting obstacle speeds. The actual speed of the obstacle at the time of these step 304 calculations is known but used in a subsequent process step.

It is recognized that different sets of values of Vo (other than 0 and Vh) can also be selected for specifying the warning profiles for the desired range rates. For example, Vo=Vh/2 and Vo =3Vh/4 set will generate the desired warning profile for this range. By adding a bias value to D1 and D2 distance limits, a composite warning profile from Vo=0 through Vo=Vh can also be generated.

Having calculated the limiting D1 and D2 vehicle warning distance limits (based on assumed negative acceleration values), the process moves to block 306 for the use of these distance values in establishing values for two arbitrary parameters, p and q. These parameters are sometimes called free parameters in this specification because they are based in part on "freely" assumed values of Ah, Ao, Vh and Vo.

Parameter p is dimensionless with bounds of 0, 2 and relies on a linear combination of vehicle deceleration values. Parameter q (dimensions of time) acts as a bias on the host vehicle speed Vh. They are used herein together to provide for varied alert conditions under varying range rates. In the preferred case as illustrated in this embodiment, the deceleration of the obstacle and host vehicle are, or assumed to be, substantially different. It is recalled that Ah is assumed to be 6 m/s$^2$ and Ao is assumed to be 3 m/s$^2$. In such preferred case, p and q are determined by the following equations.

$$p = \frac{Vh^2}{(D1-D2) \cdot (Ao - Ah)} - \frac{2 \cdot Ah}{Ao - Ah}, \text{ and}$$

$$q = \frac{D1}{Vh} Tr - \frac{Vh}{2 \cdot Ah}$$

In applications in which the acceleration values for the host vehicle and obstacle are known, or assumed to be, substantially equal, i.e. Ao≈Ah, the free parameters p and q are determined as follows:

$$p = 2, \text{ and } q = \frac{D1}{Vh} - \frac{Vh}{2 \cdot Ah} - Tr$$

In most applications, however, the acceleration values will not both be known, and it will be preferred to use the first set of equations for determining p and q.

In an example of the calculations in this block 306 step, the known values, Vh=36 m/s and Vo=27 m/s, are used, and the assumed values, Ah=6m/s$^2$, Ao=3 m/s$^2$ and Tr=2s, are used. The computed values for parameters p and q are 1.429 and 0, respectively.

The process now proceeds to step 308 in which a warning distance, DIST, is now to be calculated.

In step 308, calculations are made using actual values of Vh and Vo. Actual values of Ah and Ao may also be used if they are available to the detection system or microprocessor. In the case in which the deceleration between the obstacle and host vehicle is assumed to be substantially different, the value of warning distance, DIST, is calculated as follows:

$$DIST = Vh \cdot Tr + \frac{Vh^2}{2 \cdot Ah} - \frac{Vo^2}{(2-p) \cdot Ah + p \cdot Ao} + Vh \cdot q.$$

For the case in which the deceleration of the obstacle and host vehicles is assumed to be substantially the same, i.e. Ao≈Ah, the warning distance DIST is determined as follows:

$$DIST = Vh \cdot Tr + \frac{Vh^2}{2 \cdot Ah} - \frac{Vo^2}{2 \cdot Ao} + Vh \cdot q.$$

Absent actual knowledge of the values of Ah and Ao, it is preferred to use the above stated assumed values. In any event, it is seen that the values of the free parameters p and q are explicitly included in the calculation of DIST and the values of D1 and D2 are also included.

Having calculated a warning distance, DIST, the process advances to step 310. In step 310, the warning distance DIST is compared to the current range between the obstacle and host vehicle. For the previous example (Vo=27 m/s, Vh=36 m/s, Tr=2 seconds, Ah=6 m/s$^2$ and Ao=3 M/s$^2$), the value of DIST is 85.5 m. If the range is less than the warning distance DIST, than an alert is required and an appropriate flag is set at a next step 312. This may be accomplished, for example, by setting a standard flag in a memory device of the processing unit 14 of FIG. 1. The flag is periodically polled for operator alert operations or vehicle control operations, as will be described.

In the event that DIST does not exceed range at the step 310, the operations of FIG. 3 are concluded by returning, via a next step 342, to the operations of FIG. 2 at step 218. From process block 218, the process moves to block 220 in which the query is answered as to whether an alarm is required. This important process step will be described after the following section.

Case Where Range Rate Is Zero

If in process block 302, it is determined that the range rate is zero or within a preset tolerance limit of zero, a modified driver alert procedure is carried out via steps 314–340. Even though the distance between the host vehicle and the obstacle is not apparently changing, it is still necessary to check for a possible alarm condition because the vehicle may be too close to the obstacle.

In block 314, simple calculations are made to determine a time to stop, from the current known velocities, for the obstacle and host vehicle. These values, designated TSO for the obstacle and TSH for the host vehicle respectively, are determined using the following equations:

TSO=Vo/Ao and TSH=Vh/Ah+Tr.

Actual velocity values are used. Unless actual acceleration data is available to the processor 14, assumed values of 6 m/s$^2$ for Ah and 3 m/s$^2$ for Ao are used. Upon completion of these calculations, the process moves to step 316.

Warning distances D11 and D22 are next determined at step 316 as follows:

$$D11 = \frac{Vh^2}{2 \cdot Ah} + Ah \cdot Tr - \frac{Vo^2}{2 \cdot Ao} \text{ and}$$

$$D22 = \frac{(Vo - Vh - Tr \cdot Ah)^2}{2 \cdot (Ah - Ao)} - \frac{Ah \cdot Tr^2}{2}.$$

Again, the above specified assumed values for Ah, Ao and Tr are used unless actual data is available.

In step 318, the time to stop of the obstacle (TSO) and host vehicle (TSH) are next compared. In this query, if TSO exceeds TSH (answer yes), the process moves to block 322 and a current active warning distance DIST is set to the warning distance D22. In the event the block 318 query is answered no, the current active warning distance DIST is set to the warning distance D11 at a step 320.

Following the execution of either step 320 or 322, the value DIST represents the applicable warning distance for the current operating conditions for both the obstacle and the host vehicle. A hypothetical time required for the obstacle and host vehicle to meet, Tm, is next determined. This determination is made at process block 324.

Again, the calculation of a Tm value requires values for Ah and Ao. For the case in which the deceleration rates of the obstacle and host vehicle are substantially different, the following equation is used. This equation is used when, as preferred, Ah is assumed to be 6 m/s$^2$ and Ao to be 3 m/s.

$$Tm = \frac{-Vo + Vh + Tr \cdot Ah \pm \sqrt{(Vo - Vh - Tr \cdot Ah)^2 - (Ah - Ao) \cdot (2 \cdot R + Ah \cdot Tr^2)}}{Ah - Ao}$$

For the case in which the deceleration of the obstacle and the host vehicle are known or assumed to be substantially the same, Tm is determined at the step 324 as follows:

$$Tm = \frac{2 \cdot R + Ah \cdot Tr^2}{2 \cdot (Vh - Vo + Tr \cdot Ah)}.$$

The process advances to process block 326 to determine if the value Tm is less than zero. This is possible since either the square root term of the first Tm expression or the denominator of the second Tm expression can be negative. The values of Ah and Ao are positive numbers. If the answer to this query is yes, the warning distance (DIST) is set to zero at a next step 328. The entry of zero at block 328 indicates an indeterminate case to protect against a false alarm condition or, in other words, a false indication of an alert condition.

If the answer to the query in step 326 is no, i.e., Tm is not less than zero, then the current active distance DIST is next compared to D22 at process step 330. If in the block 330 query, DIST equals D22, then the process moves to block 332. If the answer to the block 330 query is no, the process moves to process block 336.

In process block 332, the difference between Vo and Vh is compared to a calibrated speed K. The calibrated speed K is based on the maximum system delay time and maximum vehicle deceleration for suppressing false alarms. For a system delay time of 1.5 seconds and vehicle deceleration of 8 m/s², the calibrated speed K is set to 3 m/s. If the difference between Vo and Vh is determined to exceed K at step 332, the current active distance DIST is set to zero at a next step 334, to prevent false alarm conditions. If the difference between Vo and Vh is not less than K at the step 332, the process moves to block 336.

In process block 336, the determined active distance DIST is compared to the current range R between the obstacle and the host vehicle. If the current active warning distance, DIST, exceeds the current range R, an alert is required and an alert indication is provided at a next step 340. This is accomplished, for example, by setting an alert flag of a standard type in a memory device of the processing unit 14 of FIG. 1. After providing for the alert indication at the step 340, or if DIST does not exceed R step 336, the operations of FIG. 3 are concluded by returning, via the described step 342, to the operations of FIG. 2.

Thus, having exited the FIG. 2 process at block 216 to utilize the FIG. 3 subroutine for evaluating the need for an obstacle alarm, the process returns to FIG. 2 at block 218 for an alarm query at block 220.

In block 220, a check of processor memory is made for any alert requirement that may have been provided through the operations of FIG. 3. If an alert condition is pending, such as through an alert flag being set in a memory device of the processing unit 14 of FIG. 1, then the answer to the block 220 query is yes and an alert is issued at a next step 222. The alarm may include energizing the indicator 20 of FIG. 1. It may alternatively or additionally include actively slowing the vehicle such as by activating vehicle braking, restricting an engine intake air valve to reduce airflow through the engine, or reducing fueling rate to engine cylinders. In other words, the alarm issuance may include any useful way of assisting the vehicle operator to avoid the obstacle. After issuing the alert condition or providing for variation in control of vehicle operating conditions at step 222, the process moves to the return block 224 to initiate the next processor cycle.

As indicated in other process blocks in FIG. 2, the answers to earlier process queries (e.g., steps 208 and 214) may have previously directed the process to return block 224. Thus, the operations of FIG. 2 are concluded at step 224, and any prior ongoing microprocessor operations that may have been interrupted to provide for execution of the operations of FIGS. 2 and 3 are resumed. The operations of FIG. 2 are periodically executed in the described manner following a predetermined time period, typically less than 300 milliseconds, or following occurrence of pre-specified events while the processing unit is active, as described.

In the above examples of the practice of the invention, warning distances, such as D1, D2, D11, D22, DIST and the like, were calculated at each (or designated) cycles of the microprocessor 14. This requires computer processing time. It is to be understood that a full schedule of these calculations can be made and stored in computer memory. Such warning distance data, stopping distance data and the like can be pre-calculated and correlated with vehicle velocity, range and range rate data for storage in a lookup table in processor memory. The vehicle alert process can thus be shortened after the obstacle range and range rate have been determined.

The preferred embodiment is not intended to limit or restrict the invention since many modifications may be made through the exercise of ordinary skill in the art without departing from the scope of the invention.

While this invention has been described in terms of some specific embodiments, it will be appreciated that other forms can readily be adapted by one skilled in the art. Accordingly, the scope of this invention is to be considered limited only by the following claims.

What is claimed is:

1. A method for providing an automotive vehicle alert for alerting of a condition of closing upon an obstacle preceding the vehicle, comprising the steps of:

detecting an obstacle proceeding the vehicle;

determining the range to the obstacle;

determining the velocity of said vehicle and the velocity of said obstacle;

determining the time rate of change in the range and when said rate of change is, in case (a), within a preset tolerance limit of zero or, in case (b), is negative and not within a preset tolerance limit of zero;

comparing the determined value of range with a calculated warning distance, said calculated warning distance, in case (a), including assumed values of negative acceleration for said vehicle and obstacle; or, in case (b), including calculating a first limiting warning distance between said vehicle and obstacle assuming that the velocity of said obstacle is zero and assuming a constant negative acceleration value for said vehicle, calculating a second limiting warning distance between said vehicle and obstacle assuming that the velocity of said obstacle is equal to said velocity of said vehicle and assuming values of negative acceleration for said vehicle and obstacle, calculating a third warning distance between said vehicle and obstacle using assumed values of negative acceleration for said vehicle and obstacle and the values of said first and second limiting warning distances such that said third warning distance is intermediate to the values of said limiting distances, and comparing said third warning distance with said range; and indicating the alert when the determined range is less than said warning distance for case (a) or case (b), as appropriate.

2. A method as recited in claim 1 comprising calculating said first, second and third warning distances using a first assumed negative acceleration value for decreasing the velocity of said vehicle to zero and a second assumed negative acceleration value for reducing a velocity of said obstacle to zero, and using said first and second warning distances to establish parameters to be used with said negative values of acceleration in calculating said third distance.

3. A method as recited in claim 2 in which the absolute value of said vehicle acceleration is greater than the absolute value of said obstacle acceleration.

4. A method as recited in claim 2 comprising using said first and second warning distances to establish a first dimensionless parameter, p, and a second parameter, q, having the dimension of time, where p has bounds of 0, 2 and is determined by the equation:

$$p = \frac{Vh^2}{(D1-D2)(Ao-Ah)} - \frac{2Ah}{Ao-Ah},$$

except when Ao is substantially equal to Ah and then p=2, where Vh is the velocity of said vehicle, Ah is the assumed acceleration of said vehicle, Ao is the assumed acceleration of said obstacle, D1 is said first limiting warning distance and D2 is said second limiting warning distance, and q is determined by the equation:

$$q = \frac{D1}{Vh} - Tr - \frac{Vh}{2Ah},$$

where Tr is response time.

5. A method for providing an automotive vehicle alert for alerting of a condition of closing upon an obstacle preceding the vehicle, comprising the steps of:

detecting an obstacle proceeding the vehicle;

determining the range to the obstacle;

determining the velocity of said vehicle and the velocity of said obstacle;

determining the time rate of change in the range;

storing a schedule of warning profiles including calculated warning distances as a function of time rate of change in range and depending upon whether said change in range is, in case (a), within a preset tolerance limit of zero, or, in case (b), is negative and not within a preset tolerance limit of zero, said warning distances are characterized as having been pre-calculated using, in case (a), said velocities and assumed values of negative acceleration for said vehicle and obstacle and, in case (b), pre-calculated comprising calculating a first limiting warning distance between said vehicle and obstacle assuming that the velocity of said obstacle is zero and assuming a constant negative acceleration value for said vehicle, calculating a second limiting warning distance between said vehicle and obstacle assuming that the velocity of said obstacle is equal to said velocity of said vehicle and assuming values of negative acceleration for said vehicle and obstacle, calculating a third warning distance between said vehicle and obstacle using assumed values of negative acceleration for said vehicle and obstacle and the values of said first and second limiting warning distances such that said third warning distance is intermediate to the values of said limiting distances, and wherein each of the schedule of warning profiles includes a range threshold and a time rate of change in range threshold;

selecting, from the stored schedule, an active schedule as the one of the schedule of warning distances corresponding to the determined time rate of change in the range; and indicating the alert when the determined range is less than the range threshold from the active schedule and when the determined time rate of change in range exceeds the time rate of change in range threshold from the active schedule.

6. A method as recited in claim 5 comprising calculating said first, second and third warning distances using a first assumed negative acceleration value for decreasing the velocity of said vehicle to zero and a second assumed negative acceleration value for reducing a velocity of said obstacle to zero, and using said first and second warning distances to establish parameters to be used with said negative values of acceleration in calculating said third distance.

7. A method as recited in claim 6 in which the absolute value of said vehicle acceleration is greater than the absolute value of said obstacle acceleration.

8. A method as recited in claim 6 comprising using said first and second warning distances to establish a first dimensionless parameter, p, and a second parameter, q, having the dimension of time, where p has bounds of 0, 2 and is determined by the equation:

$$p = \frac{Vh^2}{(D1-D2)(Ao-Ah)} - \frac{2Ah}{Ao-Ah},$$

except when Ao is substantially equal to Ah and then p=2, where Vh is the velocity of said vehicle, Ah is the assumed acceleration of said vehicle, Ao is the assumed acceleration of said obstacle, D1 is said first limiting warning distance and D2 is said second limiting warning distance, and q is determined by the equation:

$$q = \frac{D1}{Vh} - Tr - \frac{Vh}{2Ah},$$

where Tr is response time.

* * * * *